(12) United States Patent
Xu (10) Patent No.: US 12,498,108 B2
(45) Date of Patent: Dec. 16, 2025

(54) REMOTELY CONTROLLABLE DYNAMIC LIGHTING DEVICE AND SYSTEM

(71) Applicant: Da Xu, Zhejiang (CN)

(72) Inventor: Da Xu, Zhejiang (CN)

(\*) Notice: Subject to any disclaimer, the term of this patent is extended or adjusted under 35 U.S.C. 154(b) by 0 days.

(21) Appl. No.: 19/177,422

(22) Filed: Apr. 11, 2025

(65) Prior Publication Data
US 2025/0244002 A1 Jul. 31, 2025

(51) Int. Cl.
| | |
|---|---|
| *F21V 23/04* | (2006.01) |
| *F21S 9/03* | (2006.01) |
| *F21V 19/00* | (2006.01) |
| *F21V 33/00* | (2006.01) |
| *F21Y 113/13* | (2016.01) |
| *F21Y 115/10* | (2016.01) |

(52) U.S. Cl.
CPC .......... *F21V 23/0435* (2013.01); *F21S 9/035* (2013.01); *F21V 19/004* (2013.01); *F21V 33/006* (2013.01); *F21Y 2113/13* (2016.08); *F21Y 2115/10* (2016.08)

(58) Field of Classification Search
CPC .. F21V 23/0435; F21V 19/004; F21V 33/006; F21S 9/035; F21Y 2113/13; F21Y 2115/10
See application file for complete search history.

(56) References Cited

U.S. PATENT DOCUMENTS

| | | | | |
|---|---|---|---|---|
| 4,924,893 | A * | 5/1990 | Furey | E05B 73/0005 70/59 |
| 10,512,144 | B1 * | 12/2019 | Shen | H05B 45/20 |
| 2009/0090404 | A1 * | 4/2009 | Kuelbs | A45B 25/14 135/16 |
| 2015/0362171 | A1 * | 12/2015 | Li | F21V 33/006 362/102 |
| 2018/0000241 | A1 * | 1/2018 | Wei | A45B 23/00 |
| 2019/0032359 | A1 * | 1/2019 | Jiang | A45B 25/14 |

\* cited by examiner

*Primary Examiner* — Bao Q Truong
(74) *Attorney, Agent, or Firm* — Hawaii Patent Services; Nathaniel K. Fedde; Kenton N. Fedde (57) ABSTRACT

The present disclosure provides a remotely controllable dynamic lighting device and an intelligent lighting system. The device comprises modules such as power supply module and lighting control module, along with a support structure, featuring solar power supply, diverse lighting effects with RGB light strips, and convenient assembly/disassembly. The intelligent lighting system achieves adaptive lighting effects, with dual-mode power supply and remote interaction capabilities, enhancing lighting experience to meet diverse scenario requirements.

9 Claims, 8 Drawing Sheets

REMOTELY CONTROLLABLE DYNAMIC LIGHTING DEVICE AND SYSTEM

TECHNICAL FIELD

The present disclosure relates to the field of home decoration technology, particularly to a remotely controllable dynamic lighting device and a system.

BACKGROUND

As an essential daily item, umbrellas have traditionally been limited to sunshade and rain protection. However, with technological advancements, umbrellas have begun incorporating smart features. Most smart umbrellas on the market currently install LED lights on the handle or ribs to achieve basic lighting functions, but these products have significant shortcomings:

monotonous lighting effects: the displayed lighting effects are limited to fixed-color steady glow or simple blinking, unable to create dynamic visual effects like shooting stars or fireworks;

outdated control methods: typically relying on physical buttons to switch lighting modes, which is inconvenient and offers poor user interaction;

lack of environmental adaptability: the lighting cannot automatically adjust based on ambient light intensity, potentially wasting energy during bright daylight or providing insufficient brightness at night;

structural strength of umbrella body: the sunshade umbrella, characterized by its expansive canopy surface area and predominant outdoor deployment configuration, requires enhanced stabilization structures to maintain structural integrity against atmospheric turbulence in exterior environments on the umbrella body.

SUMMARY

The present disclosure provides a remotely controlled dynamic lighting device to address the issues raised in the background art.

To achieve the above object, the present disclosure adopts the following technical solutions:

The present disclosure provides a remotely controllable dynamic lighting device, including a power supply module, a lighting control module, a remote communication module, and a support structure; wherein the lighting control module comprises a programmable controller, an LED drive circuit, and a plurality of sets of RGB light strips, with the LED drive circuit driving the RGB light strips to achieve meteor, constant illumination, and color gradient lighting effects.

The present disclosure further provides an intelligent lighting system with adaptive lighting effects, including: a dual-mode power supply module: comprising a solar assembly, an energy storage battery, and an MPPT charge management circuit; a dynamic lighting effect control module: comprising a programmable controller, a HSV real-time rendering algorithm, and a constant-current drive circuit; and a remote interaction module: based on an MQTT protocol, supporting multi-user cloud control, historical data review, and OTA firmware upgrading.

BRIEF DESCRIPTION OF DRAWINGS

The drawings, which constitute a part of this application, are provided for further understanding of the present disclosure. The illustrative embodiments of the present disclosure and the descriptions thereof are intended to explain the present disclosure and do not constitute undue limitations. In the drawings.

The above drawings include the following reference signs:

Dynamic lighting device (1); Umbrella framework (301); Snap-fit fastener (302); Light strip (306); Retaining groove (303); Boss (304); Canopy fabric (307); Reinforcement strap (309); Pole (310); Crank assembly (311); Crank housing (312); Crank handle (313); First central connection hub (315); Second central connection hub (316); Through hole (323); Rib deployment assembly (317); Pulley (318); Drawstring (319); Stopper (320); Dust cover (305); Solar assembly (321); USB-C interface (322).

DESCRIPTION OF EMBODIMENTS

The technical solution in the embodiment of the present disclosure will be clearly and completely described below with reference to the drawings. Obviously, the described embodiment is part of, rather than all of the embodiments of the present disclosure. The following description of at least one exemplary embodiment is illustrative in nature and is in no way intended to limit the present disclosure, its application or uses. Based on the embodiments in the present disclosure, all other embodiments obtained by those skilled in the art without creative work belong to the scope of protection of the present disclosure.

It should be noted that the terminology used here is only for describing specific embodiments, and is not intended to limit exemplary embodiments according to the present application. As used herein, the singular form is also intended to include the plural form unless the context clearly indicates otherwise. Furthermore, it should be appreciated that when the terms "comprising" and/or "including" are used in this specification, they specify the presence of features, steps, operations, devices, components and/or combinations thereof.

Unless otherwise specified, the relative arrangement of components and steps, numerical expressions and numerical values set forth in these embodiments do not limit the scope of the present disclosure. At the same time, it should be appreciated that for the convenience of description, the dimensions of various parts shown in the drawings are not drawn according to the actual scale relationship. Techniques, methods and equipment known to those skilled in the art may not be discussed in detail, but in appropriate cases, they should be regarded as part of the authorization specification. In all the examples shown and discussed herein, any specific values should be interpreted as illustrative, and not as limiting. Therefore, other examples of exemplary embodiments may have different values. It should be noted that similar numbers and letters indicate similar items in the following drawings, therefore once an item is defined in one drawing, it does not need to be further discussed in subsequent drawings.

Figure 1:
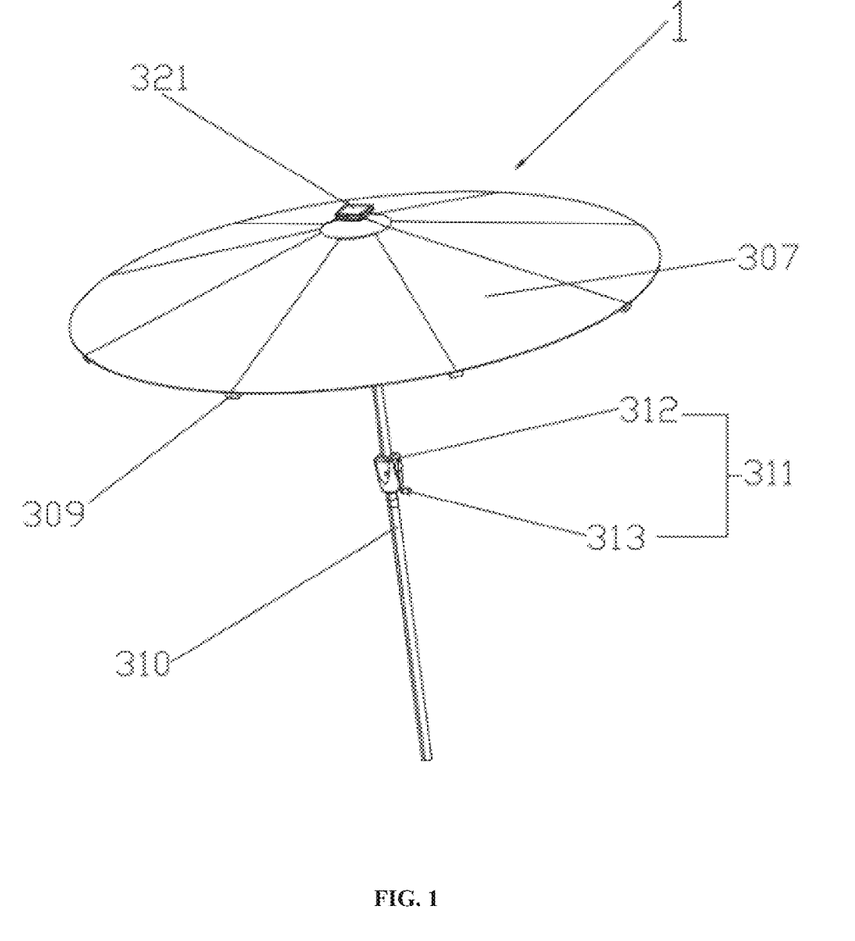
FIG. 1 is a schematic perspective view of a preferred embodiment of the present disclosure.
Figure 5:
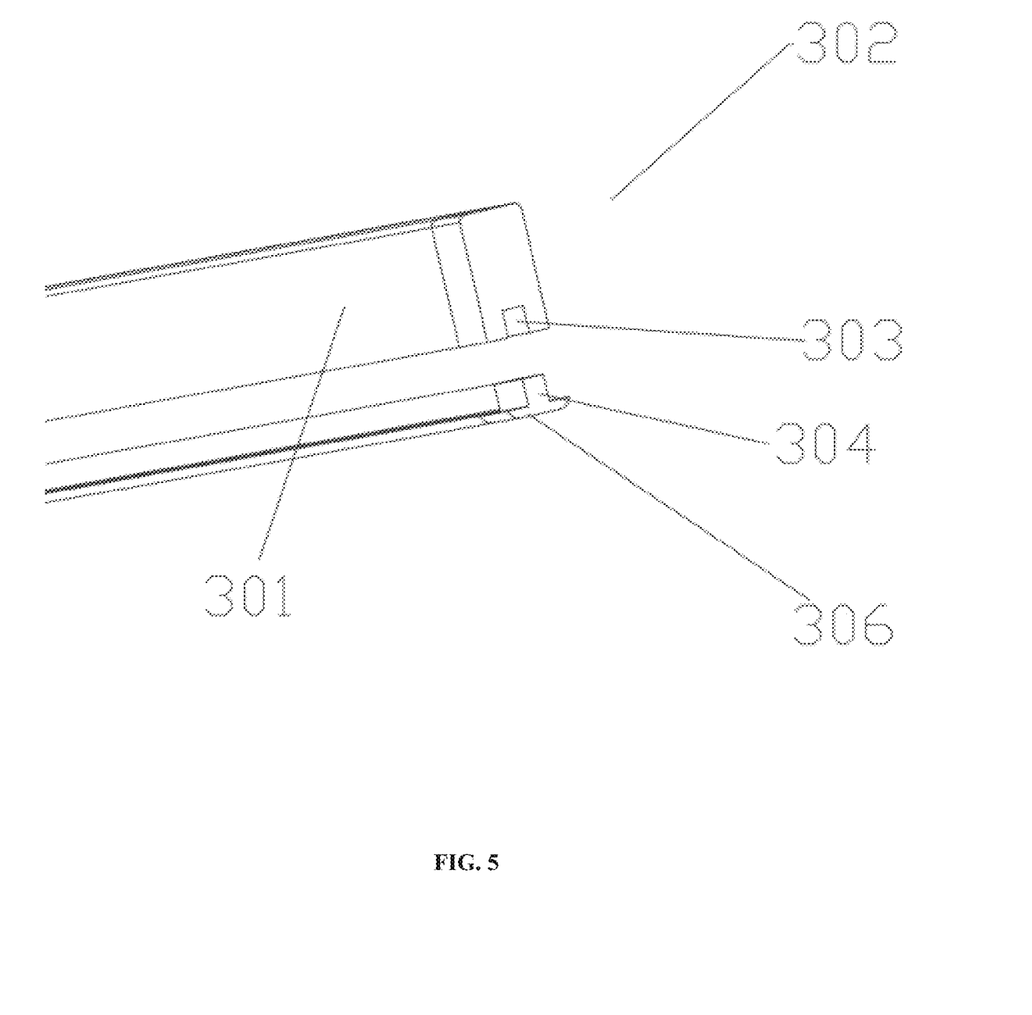
FIG. 5 is a structural schematic view of the light strip snap-fit fastener in FIG. 2.

As shown in FIGS. 1 and 5, the present disclosure provides a remotely controllable dynamic lighting device 1, which includes a power supply module, a lighting control module, a remote communication module, and a support structure (not shown). The support structure includes a high-strength metal umbrella framework 301, with a single rib capable of withstanding a tensile load of ≥2500 N. The umbrella framework 301 is equipped with RGB light strips 306 installed via modular ABS snap-fit fasteners 302. The light strips are fixed in the retaining groove 303 of the umbrella framework 301 through insulated solder joints and encapsulated and protected by a plastic tube (not shown). The snap-fit fastener 302 features a unique design where the retaining groove 303 engages with the boss 304 in the umbrella framework 301, ensuring installation accuracy. The modular ABS snap-fit fastener 302 enables extremely convenient assembly and disassembly of a single set of RGB light strips 306, with a time of ≤15 seconds per set. This significantly improves maintenance efficiency and reduces costs. In practical use, individual light strips can be replaced independently without dismantling the entire structure. In other embodiments, a magnetic strip can be embedded in the umbrella framework 301, while a corresponding magnetic patch is installed on the back of the RGB light strip 306, allowing for quick installation and removal of the light strip via magnetic attraction.

Refer to FIG. 1. A waterproof breathable polyester canopy fabric 307 is overlaid on the high-strength metal umbrella framework 301. The combination of the high-strength metal umbrella framework 301 and the waterproof breathable polyester canopy fabric 307 effectively prevents rainwater penetration. Whether encountering drizzles during daily commutes or torrential downpours in harsh weather, it ensures the user remains dry and free from rainwater intrusion, creating a dry and comfortable space. This effectively avoids discomfort caused by getting wet, reduces risks such as catching a cold, and allows users to travel in rainy weather without worries.

Figure 2:
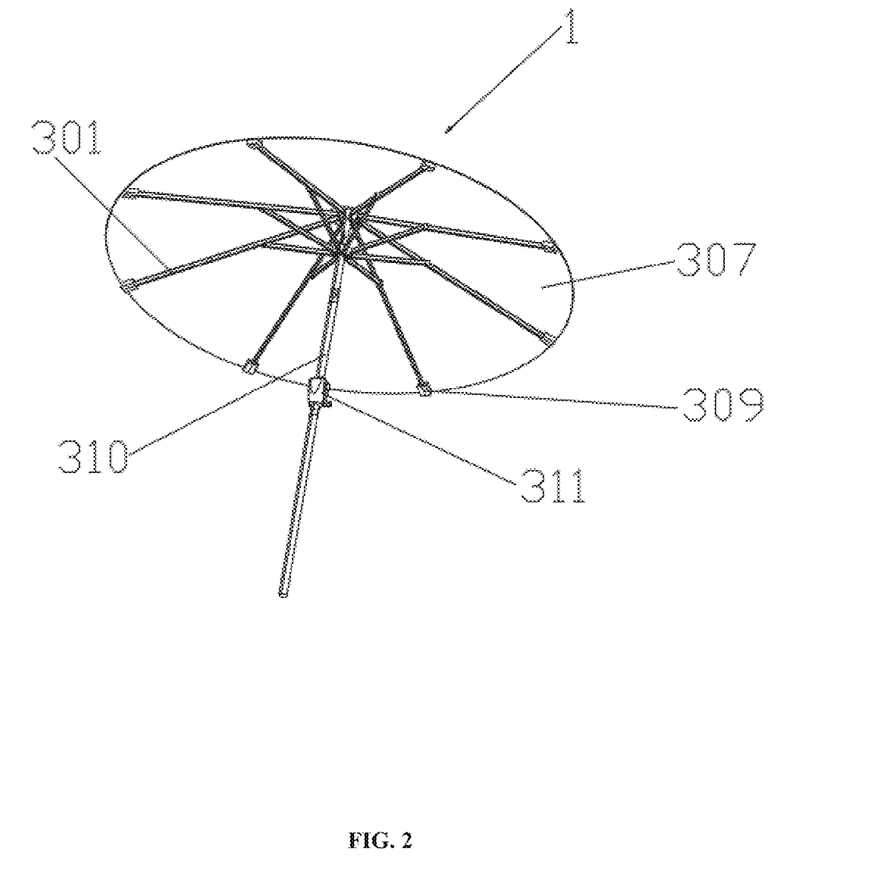
FIG. 2 is a bottom schematic view of the dynamic lighting device in FIG. 1.
Figure 3:
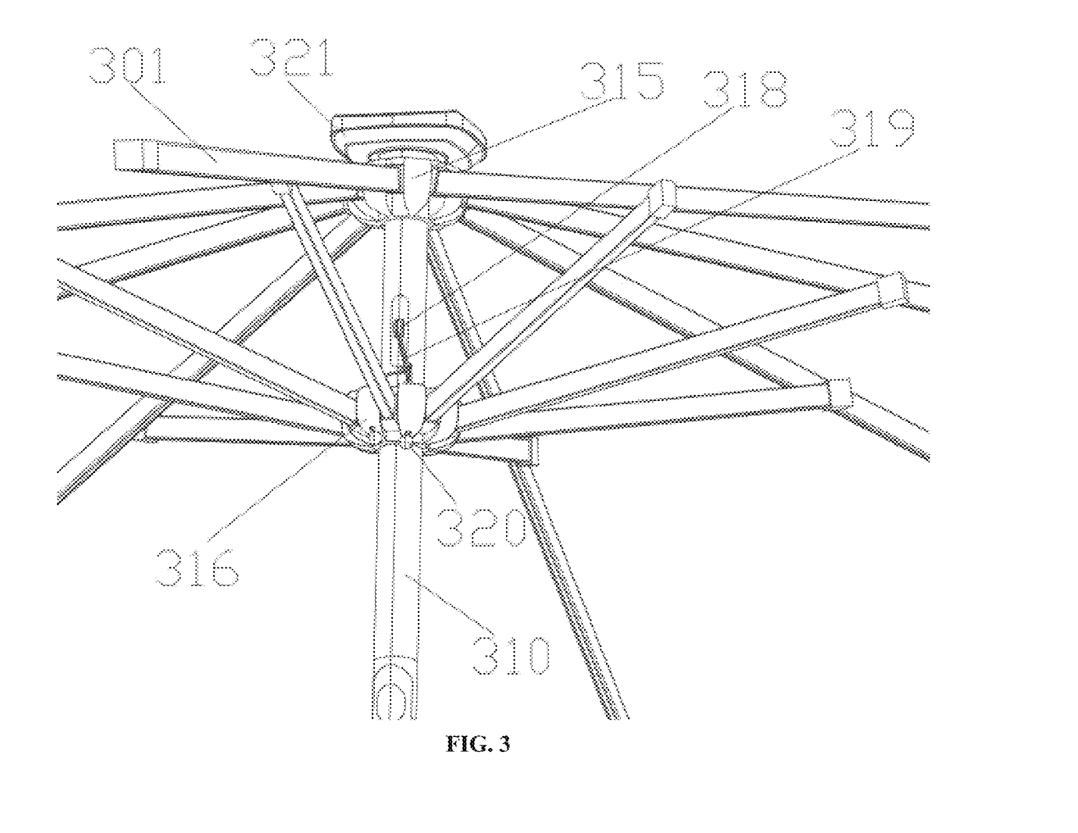
FIG. 3 is a structural schematic view of the umbrella framework in FIG. 2.

As shown in FIGS. 1 and 2, the edge of the canopy fabric 307 is equipped with an anti-detachment connection assembly to reinforce the connection between the canopy fabric 307 and the umbrella framework 301. The anti-detachment connection assembly includes a 5 cm-wide reinforcement strap 309 along the edge of the canopy fabric 307. In strong winds, ordinary umbrellas may experience issues such as the canopy fabric 307 flipping, tearing, or even detaching due to weak connections with the umbrella framework 301, rendering the umbrella unusable. However, this disclosure significantly enhances overall wind resistance through the secure connection of the reinforcement strap 309. Even in howling outdoor conditions with wind levels exceeding 6, the structure remains stable, and the canopy fabric 307 does not easily shift or detach, continuously shielding users from wind and rain. This greatly expands the applicable scenarios of the present disclosure, whether for outdoor camping, seaside walks, or urban commuting, reliably accompanying users through variable weather and providing long-lasting, stable protection. The practicality and durability of the present disclosure are notably improved. In other embodiments, besides the reinforcement strap 309, snap-fit fastener structures and hook-and-loop connections can also be used to reinforce the connection between the canopy fabric 307 and the umbrella framework 301.

Figure 6:
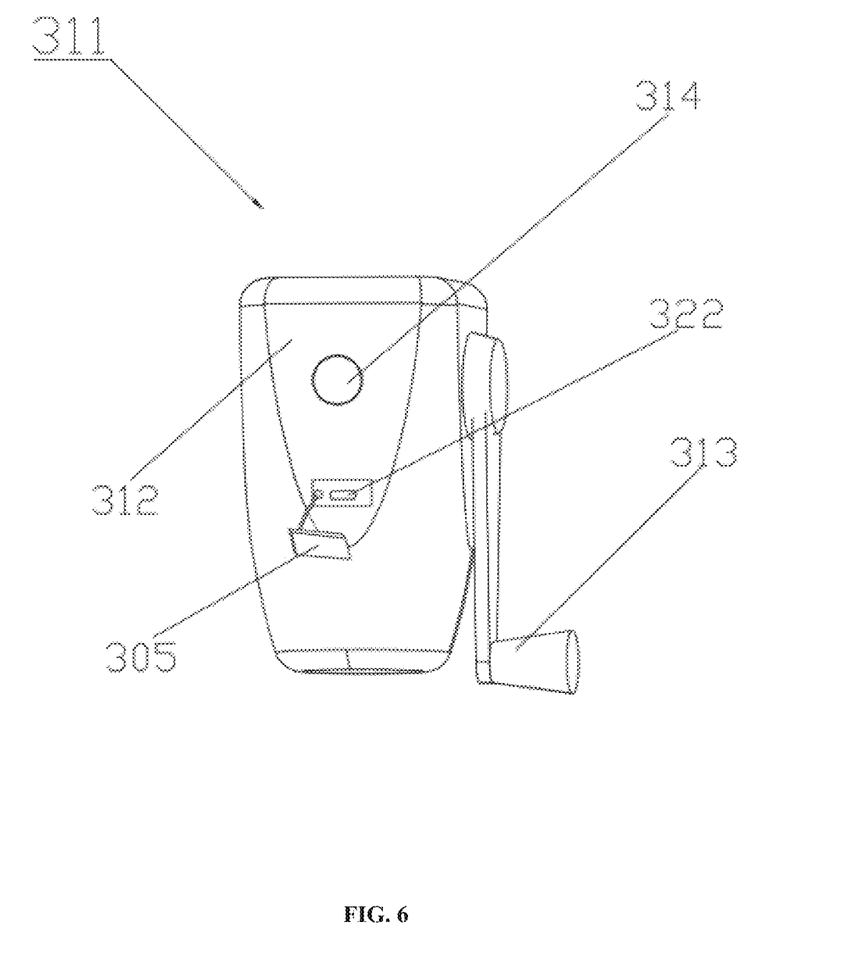
FIG. 6 is a structural schematic view of the crank assembly in FIG. 2.

As shown in FIGS. 2 and 6, the umbrella framework 301 is connected at its lower end to the pole 310. The lower end of the pole 310 is equipped with a crank assembly 311, which includes a crank housing 312 and a crank handle 313. The pole 310 is connected to the umbrella framework 301 via the first central connection hub 315 and the second central connection hub 316. The second central connection hub 316 features two through holes 323. The pole 310 acts like a bridge, tightly linking the umbrella framework 301 with the crank assembly 311 below, forming a complete and stable mechanical structure system. The design of the pole 310 effectively transmits and disperses forces from all directions, ensuring that the entire umbrella structure remains free from deformation or collapse due to uneven stress during daily use or in complex outdoor environments.

As shown in FIG. 6, in this embodiment, the crank housing 312 is equipped with a crank housing switch 314, providing an extremely convenient way for users to control the on/off state of the RGB light strip 306. When using the umbrella outdoors, users no longer need to search for complex control devices. Simply operating the crank housing switch 314 at the crank housing 312 allows for quick and independent control of the RGB light strip 306 (see FIG. 5). This intuitive and easily accessible design enables users to adjust the lighting state promptly based on actual needs. Additionally, the on/off state of the RGB light strip 306 can also be controlled via a rocker switch (not shown). The rocker switch not only operates the light strip but also features a unique local control and APP control switching function, greatly expanding the present disclosure's application scenarios and user control flexibility. In local control mode, users can directly operate the RGB light strip 306 via the rocker switch, which is ideal for situations where users are near the umbrella and wish to quickly and directly control the light strip without relying on mobile devices. When switched to APP control mode, users can remotely control the RGB light strip 306 within a certain range using a dedicated application on their mobile devices. This flexible switching between local and APP control meets diverse user needs in different scenarios, significantly enhancing the user experience. It makes the present disclosure more intelligent and convenient, enabling precise control of the RGB light strip 306 anytime, anywhere, according to user preferences, and delivering a superior and efficient lighting control experience.

Figure 4:
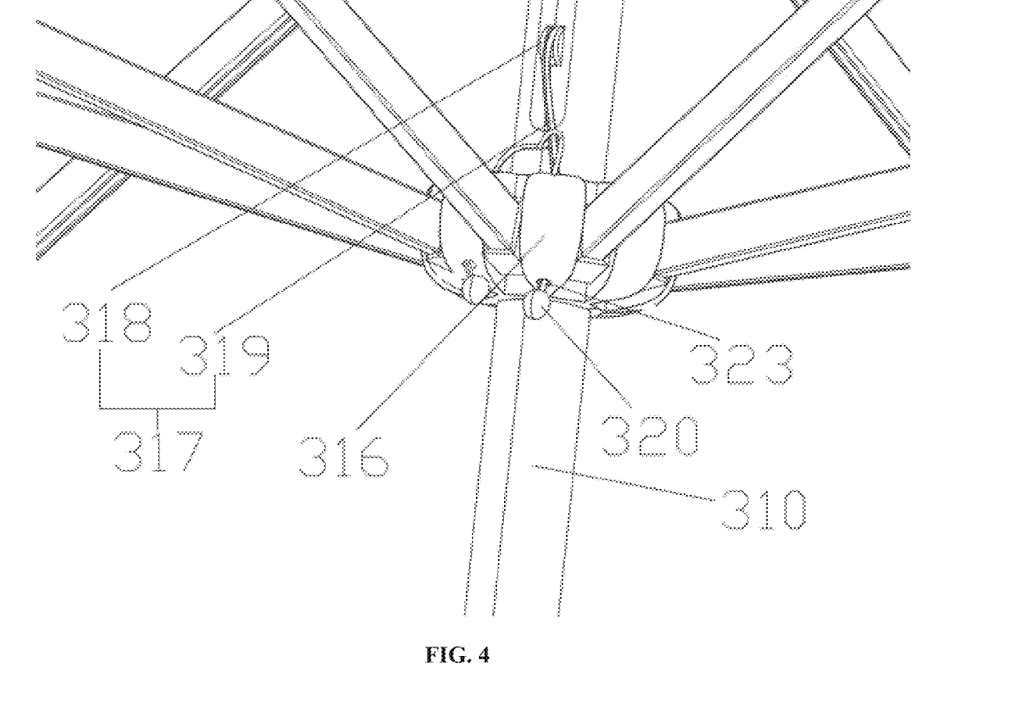
FIG. 4 is a structural schematic view of the second central connection hub in FIG. 2.

Referring to FIG. 4, in this embodiment, the umbrella framework 301 is equipped with a rib deployment assembly 317 at the central connection hub. The rib deployment assembly 317 includes a pulley 318 and a drawstring 319 arranged inside the pole 310. One end of the drawstring 319 connects to the pulley 318 and passes through a through hole 323, with a circular stopper 320 attached to this end. The stopper 320 prevents the drawstring from over-extending through the through hole 323, ensuring it remains properly positioned and maintains the structural stability of the entire rib deployment assembly 317. The shape of the stopper 320 can also be triangular, rectangular, hexagonal, or any other form. In other embodiments, the stopper 320 may be omitted, and a retaining groove can be installed at one end of the drawstring while a matching fastener is placed inside the through hole 323, securing the drawstring's position through the engagement of the retaining groove and the fastener.

Referring to FIGS. 2 and 4, in this embodiment, the other end of the drawstring 319 is connected to the crank handle 313. Rotating the crank handle 313 pulls the drawstring 319, causing the stopper 320 to move inward. This inward motion of the stopper 320 drives the second central connection hub 316 toward the first central connection hub 315, thereby folding the umbrella framework 301. The components of this structure are relatively simple and easy to disassemble. If the drawstring assembly wears out or gets damaged, it can be conveniently replaced without requiring complex tools or specialized skills. Similarly, for parts like the stopper 320, first central connection hub 315, and second central connection hub 316, any issues during use can be quickly inspected, repaired, or replaced, reducing maintenance costs and enhancing the present disclosure's maintainability, ensuring users have no long-term concerns.

Refer to FIGS. 1 and 6. In this embodiment, the support structure is equipped with a power supply module, which includes a solar assembly 321 installed at the top of the pole 310 and a USB-C interface 322 configured on the crank housing 312. Based on the principle of photoelectric conversion, solar energy is efficiently converted into electricity under sunlight to power the lamp. This solar assembly 321 not only reduces the lamp's reliance on traditional grid power, significantly cutting energy consumption and aligning with eco-friendly principles, but also greatly expands its application scenarios. Whether in off-grid environments like camping or hiking, or during daily outdoor leisure activities, the solar assembly can continuously charge the lamp, ensuring sufficient power for nighttime lighting. Additionally, during a standby mode, the present disclosure automatically cuts off non-essential circuits via a low-power electronic switch, strictly limiting system power consumption to ≤50 µA, effectively avoiding unnecessary energy loss. This low-power design, combined with solar charging and a plurality of charging modes, comprehensively meets charging needs in diverse indoor and outdoor environments. Technologically, it significantly enhances the present disclosure's practicality and user satisfaction, allowing users to enjoy convenient lighting without worrying about power issues while contributing to environmental protection.

As shown in FIG. 6, the USB-C interface 322 on the crank housing 312, leveraging its high-speed data transfer capabilities and compatibility with standards like PD, can adapt to common phone chargers, power banks, and computer USB interfaces. This eliminates the need for specialized charging equipment, greatly improving charging versatility and convenience to meet diverse needs across scenarios. The interface is externally fitted with a sealed dust cover 305, effectively blocking dust, sand, and other fine particles to prevent issues like increased contact resistance or short circuits caused by debris accumulation. This reduces interface damage risks, extends its lifespan, and ensures long-term stability and reliability in dusty outdoor environments. In other embodiments, the USB-C interface 322 may be replaced with other charging interfaces or a charging plug is directly integrated on the pole 310 for charging (see FIG. 1).

Figure 8:
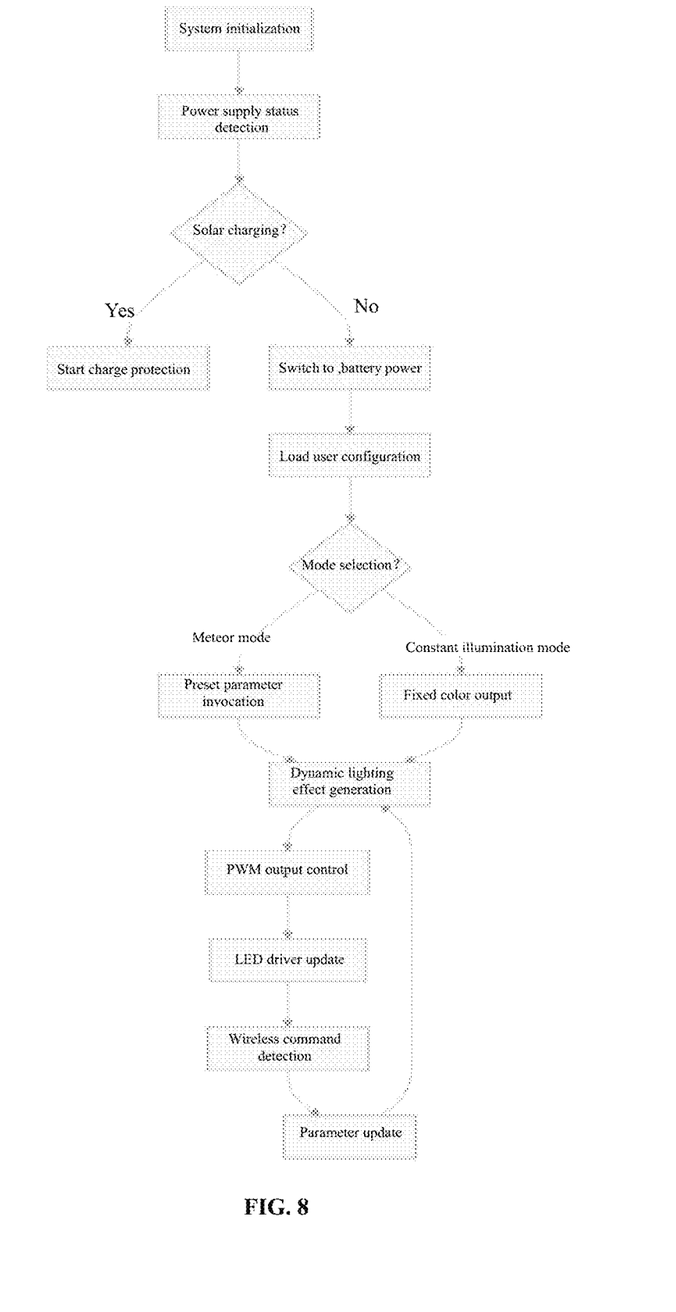

As shown in FIG. 8, the lighting control module demonstrates outstanding functional advantages through the coordinated operation of a programmable controller, LED drive circuit, and a plurality of sets of RGB light strips 306 (see FIG. 5, not shown). In a meteor mode, the spacing between RGB light strips 306 can be flexibly adjusted from 1 cm to 10 cm, with a default spacing of 5 cm. This carefully designed variable spacing greatly enriches the visual presentation of meteor mode. When the light strip spacing is small, such as 1 cm, the light and shadow effects of the meteor trail appear denser, resembling a starry meteor shower in the night sky, which can bring strong visual impact and dynamic energy to a space. This is particularly suitable for creating scenes full of passion and excitement, such as outdoor music festivals or lively parties. Conversely, when the light strip spacing is increased to 10 cm, the meteor light and shadow become sparser, presenting a soothing and leisurely dynamic effect, as if meteors are slowly traversing the vast sky. This can create a tranquil and romantic atmosphere, ideal for scenarios like romantic dates or outdoor bonfire gatherings.

Additionally, in this embodiment, the lighting control module is preconfigured with a constant illumination mode to provide stable and bright basic lighting for spaces, meeting daily illumination needs. The module supports independent adjustment of color parameters in the HSV color space, allowing users to precisely select their desired hues from a rich color spectrum—whether it's fiery red or serene blue. At the same time, dynamic parameters such as trail length and attenuation rate are also adjustable. For example, increasing the trail length can further enhance the visual impact of meteor mode, while adjusting the attenuation rate can alter the rhythm of light effects. These features enable the lighting control module 200 to not only greatly diversify lighting effects and effortlessly create various scene atmospheres— such as romantic, energetic, or cozy—for scenarios ranging from outdoor gatherings and indoor decorations to special events, but also empower users to design personalized lighting environments. This significantly improves user experience, transforming lighting fixtures from mere illumination tools into powerful assistants for crafting unique spatial atmospheres.

Figure 7:
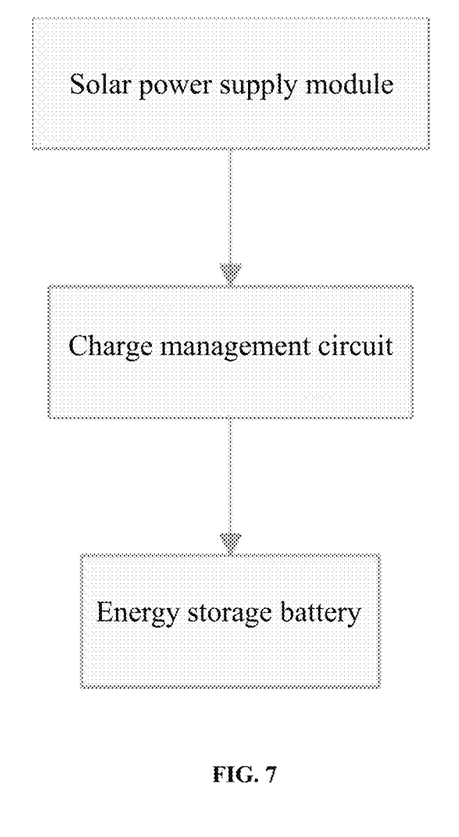
FIGS. 7 and 8 are system flowcharts of the present disclosure.

As shown in FIGS. 7 and 8, the remote communication module integrated in the present disclosure operates based on 2.4G/Bluetooth protocol. Through a mobile app, users can wirelessly adjust lamp brightness, color, and dynamic parameters, significantly enhancing operational convenience. The middle pole 310 adopts a composite structure of iron/aluminum tubes and plastic tubes, with internal wiring (not shown) connecting the lamp control device to the crank housing switch 314. This enables switch signals to transmit through internal channels within the pole 310, avoiding exposed wiring, thus ensuring signal transmission stability while improving the present disclosure's overall aesthetics and safety. For lighting control, the LED drive circuit employs a constant-current chip cascading method, enabling synchronous control of over 90 RGB lamp beads with a signal transmission latency below 10 µs, ensuring rapid response to commands for smooth, stable, and vibrant lighting effects.

As shown in FIGS. 7 and 8, the present disclosure further provides an intelligent lighting system with adaptive lighting effects, including a dual-mode power supply module, a dynamic lighting effect control module, and a remote interaction module. The dual-mode power supply module includes a solar assembly 321 (see FIG. 1), an energy storage battery, and a MPPT charge management circuit (supporting automatic power source switching).

The remote interaction module operates based on on the MQTT protocol, leveraging its efficient and stable transmission characteristics to support multi-user cloud control. This allows users from different locations to collaboratively operate devices seamlessly, meeting needs such as shared public lighting management or household lamp control. It also enables historical data traceback, helping users analyze usage habits based on past operational data (e.g., lighting effect frequency/duration) to optimize lighting strategies for energy efficiency. Additionally, it features OTA firmware updating to keep the performance of the device competitive. The module supports cloud storage for user-customized lighting effects (with a storage content≥50 sets per device), empowering creative freedom—whether preserving romantic ambiance for dates or vibrant party lighting. Meanwhile, the programmable controller integrates a function memory module, storing at least 10 sets of user-defined lighting effects for convenient local customization. Its OTA firmware updating complements the remote interaction module, ensuring comprehensive software optimization, thereby delivering a one-stop premium experience in convenient control, personalized customization and sustained performance upgrades, greatly enhancing the present disclosure's applicability and user engagement.

The MPPT charge management circuit employs the perturbation and observation method to continuously monitor the output status of the solar assembly. In addition, by dynamically adjusting the charging duty cycle, it achieves precise control over solar energy utilization efficiency, resulting in a more than 30% improvement compared to traditional charging methods. This not only means that under the same lighting conditions, the luminaire can obtain more sufficient power, effectively extending illumination duration and reducing reliance on conventional electricity, but also ensures stable and efficient operation of the luminaire in environments such as remote outdoor operations in remote areas or frequent power outages. This provides users with a longer-lasting and more reliable lighting experience while reducing energy consumption and carbon emissions, contributing to environmental protection efforts.

The system, with its optocoupler-isolated drive circuit and EMI protection design incorporating digital filtering algorithms, increases the signal-to-noise ratio to ≥95 dB. This effectively ensures stable signal transmission, significantly reduces the impact of external electromagnetic interference on system operation, and guarantees reliable and efficient performance of the equipment even in complex electromagnetic environments.

Implementation of the dynamic lighting effect control module:
- S1. Independent adjustment of trail length (3-8 LEDs) and attenuation rate in the meteor mode: users can independently adjust the trail length and attenuation rate of the meteor mode according to different usage scenarios and personal preferences, thereby creating a unique lighting atmosphere;
- S2. Adaptive brightness compensation based on ambient light intensity in constant illumination mode (accuracy±5%): the precise brightness compensation function (accuracy±5%) ensures that the brightness of the luminaire always matches the ambient light intensity, avoiding discomfort to the human eye caused by sudden brightness changes or inappropriate brightness levels.

In the description of the present disclosure, it should be appreciated that directional terms such as "front, rear, up, down, left, right", "horizontal, vertical, perpendicular, horizontal" and "top, bottom" etc. indicate the orientation or positional relationship based on the orientation or positional relationship shown in the drawings, and are only for the convenience of describing the present disclosure and simplifying the description. In the absence of a contrary explanation, these directional terms do not indicate or imply that the device or element referred to must have a specific orientation or be constructed and operated in a specific orientation, and therefore should not be understood as limiting the scope of protection of the present disclosure; the directional terms "inside, outside" refer to the inside and outside relative to the contour of each component itself.

For the convenience of description, spatial relative terms such as "on . . . ", "above . . . ", "on the upper surface of . . . ", "upper" etc. may be used here to describe the spatial positional relationship of a device or feature with other devices or features as shown in the drawings. It should be appreciated that spatial relative terms are intended to encompass different orientations of the device in use or operation other than the orientation described in the drawings. For example, if the device in the drawing is inverted, the device described as "above other devices or structures" or "on other devices or structures" will subsequently be positioned as "below other devices or structures" or "under other devices or structures". Thus, the exemplary term "above" can include both "above" and "below" orientations. The device can also be positioned in other different ways (rotated 90 degrees or in other orientations), and the spatial relative descriptions used here should be interpreted accordingly.

In addition, it should be noted that the use of terms such as "first", "second" etc. to define components is for the convenience of distinguishing the corresponding components. Unless otherwise stated, the above terms have no special meaning, and therefore should not be understood as limiting the scope of protection of the present disclosure.

The above description is only a preferred embodiment of the present disclosure and is not intended to limit the present disclosure. For those skilled in the art, the present disclosure can have various modifications and changes. Any modifications, equivalent replacements, improvements etc. made within the spirit and principles of the present disclosure should be included within the scope of protection of the present disclosure.

What is claimed is:

1. A remotely controllable dynamic lighting device, comprising:
   a power supply module, a lighting control module, a remote communication module, and a support structure; wherein the lighting control module comprises a programmable controller, an LED drive circuit, and a plurality of sets of RGB light strips, with the LED drive circuit driving the RGB light strips to achieve meteor, constant illumination, and color gradient lighting effects;
   the support structure comprises an umbrella framework, the RGB light strips are fixed to the umbrella framework via modular ABS snap-fit fasteners, with single-unit assembly/disassembly time≤15 seconds; and
   a lighting control system comprises:
   a crank housing switch; and
   a rocker switch.

2. The device according to claim 1, wherein the power supply module comprises a solar power generation assembly, an energy storage battery, and a charge management circuit, featuring overcharge/overdischarge protection and an external charging interface, supporting dual-mode charging via solar power and external power sources.

3. The device according to claim 1, wherein the lighting control module presets at least two dynamic lighting effect modes including the meteor mode and the constant illumination mode, supporting independent adjustment of color parameters in HSV space D and dynamic parameters.

4. The device according to claim 1, wherein the remote communication module is based on 2.4G/Bluetooth protocols, supporting wireless adjustment of brightness, color, and dynamic parameters via a mobile terminal APP.

5. The device according to claim 1, wherein the umbrella framework is a high-strength metal umbrella framework (with a tensile load resistance ≥2500 N), waterproof breathable polyester canopy fabric, and an anti-detachment connection assembly; and an edge of the canopy fabric is equipped with a 5 cm-wide reinforcement strap, achieving an overall wind resistance rating ≥level 6.

6. A remotely controllable dynamic lighting device, comprising:

a power supply module, a lighting control module, a remote communication module, and a support structure; wherein the lighting control module comprises a programmable controller, an LED drive circuit, and a plurality of sets of RGB light strips, with the LED drive circuit driving the RGB light strips to achieve meteor, constant illumination, and color gradient lighting effects;

wherein the lighting control module presets at least two dynamic lighting effect modes including the meteor mode and the constant illumination mode, supporting independent adjustment of color parameters in HSV space and dynamic parameters of trail length and attenuation rate; and wherein in meteor mode, a spacing of the RGB light strips ranges from 1 cm to 10 cm, the light strips are fixed in an upper pole retaining groove via insulated solder joints and encapsulated by plastic tubing for protection.

7. The device according to claim 5, wherein a middle pole adopts a composite structure of iron/aluminum tubing and plastic tubing, with internal wiring connecting a lighting control device to an umbrella handle switch, supporting switch signal transmission through internal channels within the pole to avoid external exposure.

8. The device according to claim 1, wherein the LED drive circuit employs constant-current chip cascading, supporting synchronous control of over 90 RGB LAMP BEADs with a signal transmission delay <10 μs.

9. The device according to claim 1, wherein in a standby mode, non-essential circuits are cut off via low-power electronic switches, with a system power consumption ≤50 μA.

\* \* \* \* \*